(12) United States Patent
Furukawa

(10) Patent No.: US 7,113,495 B2
(45) Date of Patent: Sep. 26, 2006

(54) DATA TRANSMISSION METHOD AND APPARATUS IN RELAY TRANSMISSION TYPE RADIO NETWORK

(75) Inventor: Hiroshi Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 956 days.

(21) Appl. No.: 10/010,530

(22) Filed: Dec. 5, 2001

(65) Prior Publication Data

US 2002/0080736 A1 Jun. 27, 2002

(30) Foreign Application Priority Data

Dec. 27, 2000 (JP) ............................. 2000-398917

(51) Int. Cl.
*H04Q 7/00* (2006.01)
(52) U.S. Cl. ...................................... 370/329; 370/338
(58) Field of Classification Search ................ 370/279, 370/280, 328, 338, 390, 432
See application file for complete search history.

(56) References Cited

U.S. PATENT DOCUMENTS 5,570,366 A * 10/1996 Baker et al. ................. 370/312
5,602,903 A * 2/1997 LeBlanc et al. ............ 455/456.2
5,742,588 A * 4/1998 Thornberg et al. .......... 370/236
6,347,091 B1 * 2/2002 Wallentin et al. ........... 370/437
6,389,008 B1 * 5/2002 Lupien et al. ............... 370/352
6,469,991 B1 * 10/2002 Chuah ......................... 370/329
2001/0036810 A1 * 11/2001 Larsen ........................ 455/11.1

* cited by examiner

*Primary Examiner*—Ricky Q. Ngo
*Assistant Examiner*—Jonathan Liou
(74) *Attorney, Agent, or Firm*—Dickstein, Shapiro, LLP.

(57) ABSTRACT

To provide a data transmission method and an apparatus thereof in a relay transmission type radio network capable of selecting an appropriate down-link relay route according to a location of a terminal station. A first relay node having received an up-link ACK packet transmitted by the terminal station transmits to an second relay node the up-link ACK packet including a source terminal station ID and a relay source node ID representing its own node ID. The second relay node having received the up-link ACK packet registers information on a pair of the source terminal station ID and the relay source node ID with a relay node list, and selects an appropriate route of a down-link packet addressed to the terminal station by using the information registered with the relay node list.

15 Claims, 10 Drawing Sheets

| NODE ID | TERMINAL STATION ID |
|---------|---------------------|
| BS-a | MS-1, MS-5, MS-7 |
| BS-c | MS-2, MS-3 |
| BS-f | MS-4, MS-6, MS-8 |
| ... | ... |

FIG.7

| NODE ID | TERMINAL STATION ID |
|---|---|
| RN-5 | MS-D |

FIG.8

| NODE ID | TERMINAL STATION ID |
|---|---|
| RN-1 | MS-A |
| RN-2 | MS-B, MS-D |

FIG.9

| NODE ID | TERMINAL STATION ID |
|---|---|
| RN-3 | MS-A, MS-B, MS-C, MS-D |

| NODE ID | TERMINAL STATION ID |
|---------|---------------------|
| RN-1 | ~~MS-A~~ — CANCELED |
| RN-2 | MS-A, MS-B, MS-D (MS-A ADDED) |

| OTHER | RELAY DESTINATION NODE ID | RELAY SOURCE NODE ID | SOURCE TERMINAL STATION ID |

501, 502, 503, 504

| OTHER | RELAY DESTINATION NODE ID | RELAY SOURCE NODE ID | DESTINATION TERMINAL STATION ID |

601, 602, 603, 604

DATA TRANSMISSION METHOD AND APPARATUS IN RELAY TRANSMISSION TYPE RADIO NETWORK

BACKGROUND OF THE INVENTION

1. Field of the Invention

The present invention relates to a data transmission method and an apparatus therefor in a relay transmission type radio network.

2. Description of the Related Art

FIG. 18 is a diagram illustrating a cell configuration of a conventional cellular system. As for the cell configuration of this cellular system, it is comprised of cells 101 and base stations (nodes) 102, where a serviceable area is constituted by placing a plurality of cells as in FIG. 18. Each of nodes 102 is connected by a wire basic network 104 and a wire circuit 103, so that service signals such as voice and data and various control signals are communicated via these links. Moreover, there are cases where each of nodes 102 is connected to the wire basic network 104 by providing concentration stations or the like hierarchically between them. A terminal station 105 performs communication with the node 102, and transmits and receives various signals communicated by the wire basic network 104 and the wire circuit 103. The wire basic network 104 has a server apparatus installed for managing location information on the terminals and radio nodes, and performing accounting and so on.

In order to cope with the increase in the number of subscribers to the cellular systems such as portable telephones and the Fixed Wireless Access, a technique of reducing a cell radius to decrease a processing load per node is adopted. In the case of constructing the system with such minimal cells, a very large number of the nodes are placed so as to secure a service area.

In addition, in the case where a high density data transmission system such as multilevel modulation is applied in order to sup-linkport high-speed data transmission, the area covered by one node inevitably becomes smaller to secure required received quality, and so a very large number of the nodes are also placed in this case.

Furthermore, while the cellular systems were mainly designed in quasi-micro and microwave zones in the past, construction of the cellular systems using quasi-millimeter and millimeter wave zones is expected because of a crisis of frequency pressure. A higher frequency weakens a diffraction effect and makes it markedly straight so that an unexpected call becomes difficult, which inevitably leads to a smaller area covered by each node. To be more specific, a very large number of the nodes are also placed in such a case since a call area must be secured with the minimal cells.

In the case of constructing the systems with a large number of the minimal cells, it is essential to consolidate a wire network for the purpose of connecting the node group-link to the basic network. To connect a very large number of the geographically unevenly distributed nodes with the basic network, however, it is necessary to install the wire networks everywhere and so the cost of the entire system increases. Therefore, there is a technique of connecting the nodes by radio and performing relay transmission so as to expand the service area.

FIG. 19 is a diagram illustrating an example of the cell configuration wherein relay nodes 204, 205 and 206 are placed around a core node 203 connected to a wire network 201 by a wire circuit 202 and the relay nodes and the core node are connected by radio. A symbol 208 indicates an example of an area covered by the node. The up-link packet transmitted from a terminal 207 reaches the core node 203 via the relay nodes 205 and 204, and then the packet received by the core node 203 is communicated to the wire network 201 by way of the wire circuit 202. On the other hand, the down-link packet to the terminal 207 sent from the wire network 201 is sent to the core node 203 first by way of the wire circuit 202 and then is communicated from the core node 203 to the terminal 207 by way of the relay nodes 204 and 205.

In the case of transmitting the down-link packet in the cell configuration shown in FIG. 19, there was a challenge that the appropriate relay route must be selected out of a plurality of the relay routes according to the location of the terminal 207, and that, if the terminal station moves, the relay route of the down-link packet to the terminal station must be changed as appropriate following the move.

SUMMARY OF THE INVENTION

Thus, an object of the present invention is to provide the data transmission method and apparatus in a relay transmission type radio network capable of selecting the appropriate down-link relay route according to the location of the terminal station.

Another object of the present invention is to provide the data transmission method and apparatus in the relay transmission type radio network allowing the down-link relay route to be changed following the move of the terminal station and capable of selecting the down-link relay route appropriate to the above described move.

According to the first aspect of the present invention, a data transmission method in a relay transmission type radio network including a core node connected to a wire network, relay nodes relaying a down-link packet transmitted from said core node and an up-link packet directed toward said core node and a terminal station capable of transmission and reception of packet with both of said core node and said relay node, comprising:

a registration step for registering with a relay node list held by the node, as a pair, ID information on said terminal station and a relay source node included in the up-link packet transmitted by said terminal station, in each of said core node and said relay node; and a selection step for selecting a down-link relay route of the down-link packet addressed to said terminal station on the basis of said relay node list, in each of said core node and said relay node.

According to the second aspect of the present invention, a relay node relaying a down-link packet transmitted from a core node connected to a wire network and an up-link packet directed toward said core node, and capable of communication with a terminal station, comprising a relay node list for having recorded ID information on said terminal station and a relay source node included in the up-link packet directed toward said core node by said terminal station and giving a down-link relay route of the down-link packet addressed to said terminal station on the basis of said ID information.

According to the third aspect of the present invention, a core node connected to a wire network, and capable of transmission and reception of packet with both of a terminal station and a relay node, comprising a relay node list for having recorded ID information on said terminal station and the relay node that is a relay source node included in a received up-link packet and giving a down-link relay route of a down-link packet addressed to said terminal station on the basis of said ID information is provided.

According to the fourth aspect of the present invention, a terminal station capable of transmission and reception of packet with both of a core node connected to a wire network and a relay node relaying a down-link packet transmitted from said core node and an up-link packet directed toward said core node, setting ID information on a source terminal station registered with a relay node list of said core node or said relay node as a pair with ID information on a relay source node on said up-link packet and transmitting said up-link packet to a relay destination node.

In the data transmission method according to the present invention, each of the core node and the relay nodes has the relay node list for giving the down-link relay route of the down-link packet addressed to the terminal station, and selects the appropriate down-link relay route for the down-link packet addressed to the terminal station according to the location of the terminal station on the basis of the relay node list.

The relay node according to the present invention holds as the relay node list the ID information on the terminal station and the relay source node included in the up-link packet directed toward the core node by the terminal station and selects the appropriate down-link relay route for the down-link packet addressed to the terminal station on the basis of information on the up-link relay route according to the ID information of the relay node list.

The core node according to the present invention holds as the relay node list the ID information on the terminal station and the relay source node included in the up-link packet transmitted by the terminal station and received by way of the relay destination node, and selects the appropriate down-link relay route for the down-link packet addressed to the terminal station on the basis of information on the up-link relay route according to the ID information of the relay node list.

The terminal station according to the present invention transmits to the relay destination node the up-link packet including the ID information on the source terminal station registered with the relay node list of the core node or the relay node as a pair with an ID number of the relay source node. Thus, it becomes possible, in each of the core node and the relay nodes, to generate the relay node list used to select the down-link relay route of the down-link packet addressed to the terminal station, and thus selection of the appropriate down-link relay route for the down-link packet is implemented.

BRIEF DESCRIPTION OF THE DRAWINGS

FIG. 7 is a diagram illustrating the relay node list generated by the relay node list generation procedure according to the embodiment of the present invention;

FIG. 8 is a diagram illustrating the relay node list generated by the relay node list generation procedure according to the embodiment of the present invention;

FIG. 9 is a diagram illustrating the relay node list generated by the relay node list generation procedure according to the embodiment of the present invention;

DESCRIPTION OF THE PREFERRED EMBODIMENT

An embodiment of the present invention will be described hereafter.

First, selection of a down-link relay route in this embodiment will be described by using FIGS. 1, 2, 3 and 4. In this embodiment, a case where a relay destination node (receiver side relay node) for each relay node to relay and transmit an up-link packet is already known is assumed. To be more specific, the case where the relay route of the up-link packet is given in advance is assumed. There are the cases where a directional antenna is installed on each relay node and core node. There are the cases where the directional antenna is fixedly installed and where it is adaptably installed as to its directivity. Installing the directional antenna cuts back interference given to surrounding nodes and the terminal station, whereby it becomes possible to achieve high link capacity in the entire system.

Figure 1:
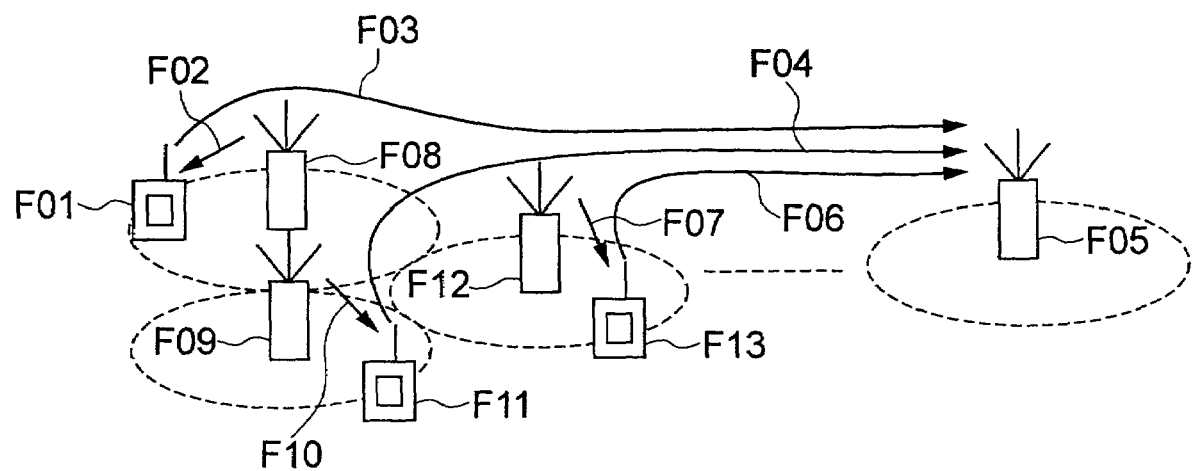
FIG. 1 is a schematic diagram showing how a terminal station having received a broadcast packet sends back an up-link ACK packet in a data transmission method according to an embodiment of the present invention.

Each relay node and core node periodically transmits a broadcast packet, and there are the cases where the broadcast packet is transmitted with fixed transmitting power. Details of the broadcast packet and an up-link ACK packet are described later by using FIGS. 2 and 3. In FIG. 1, relay nodes F08, F12 and F09 periodically transmit the broadcast packet by way of down-link radio circuits F02, F07 and F10 respectively. Each terminal station receives the broadcast packets from a plurality of nodes, and selects the node having transmitted the broadcast packet of the highest received power or of the best received quality of the received broadcast packets. Terminals F01, F13 and F11 in FIG. 1 select the relay nodes F08, F12 and F09 respectively. The terminals F01, F13 and F11 having selected the above described relay nodes transmit the up-link ACK packets to the relay nodes F08, F12 and F09 respectively. The up-link ACK packets transmitted from the terminals F01, F13 and F11 are communicated to a core node F05 by way of relay routes F03, F06 and F04 respectively.

Figure 2:
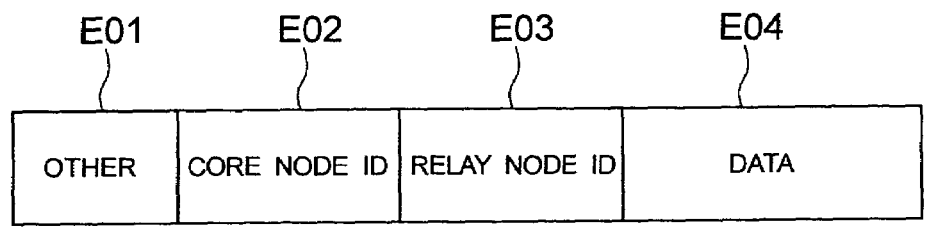
FIG. 2 is a schematic diagram showing a field configuration of the broadcast packet in the data transmission method according to the embodiment of the present invention.

FIG. 2 is a schematic diagram showing a field configuration of the broadcast packet according to the embodiment of the present invention. The broadcast packet is comprised of a field E02 showing a core node ID, a field E03 showing a relay node ID, a field E04 showing data and an other field E01. In each of the relay nodes, the ID of the core node of a cell to which the relay node belongs is set in the core node ID field E02. On the core node, its own node ID is set in the relay node ID field E03. Moreover, there are cases where the core node ID field E02 is excluded. The other field E01 has a pilot signal, a packet ID and the like set therein. There are cases where the order of the fields is changed. There are also the cases where the other field E01 is divided and placed.

Figure 3:
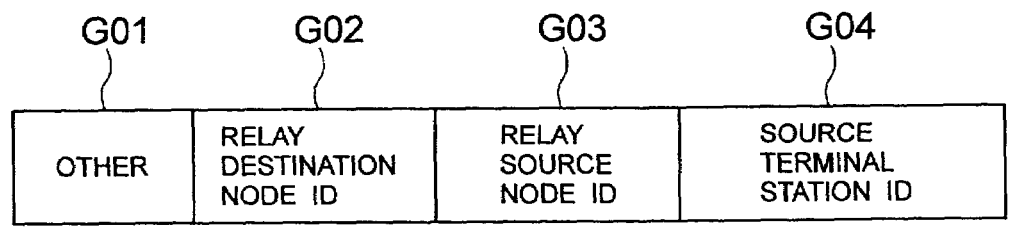
FIG. 3 is a schematic diagram showing a configuration of the ACK packet in the data transmission method according to the embodiment of the present invention.

FIG. 3 is a schematic diagram showing a configuration of the up-link ACK packet that is a response signal in the case where the terminal station according to the embodiment of the present invention receives the broadcast packet. The up-link ACK packet is comprised of a field G02 showing a relay destination node (receiver side relay node) ID, a field G03 showing a relay source node (sender side relay node) ID, a field G04 showing a source terminal station ID, and an other field G01. Each of the relay nodes sets an up-link relay destination node ID as the relay destination node ID, sets its own node ID as the relay source node ID, and sets the ID of the terminal station having transmitted the up-link ACK packet as the source terminal station ID. In the case where each of the terminal stations sends the up-link ACK packet, the terminal station sets the information indicating that it has transmitted in the relay source node ID field G03. It is also possible to simultaneously set a plurality of the relay destination node IDs in the relay destination node ID field G02. The other field G01 has a pilot, an up-link and down-link link indicator, a packet ID, data and the like set therein. The order of the fields may change. The other field G01 may be divided and placed.

Figure 4:
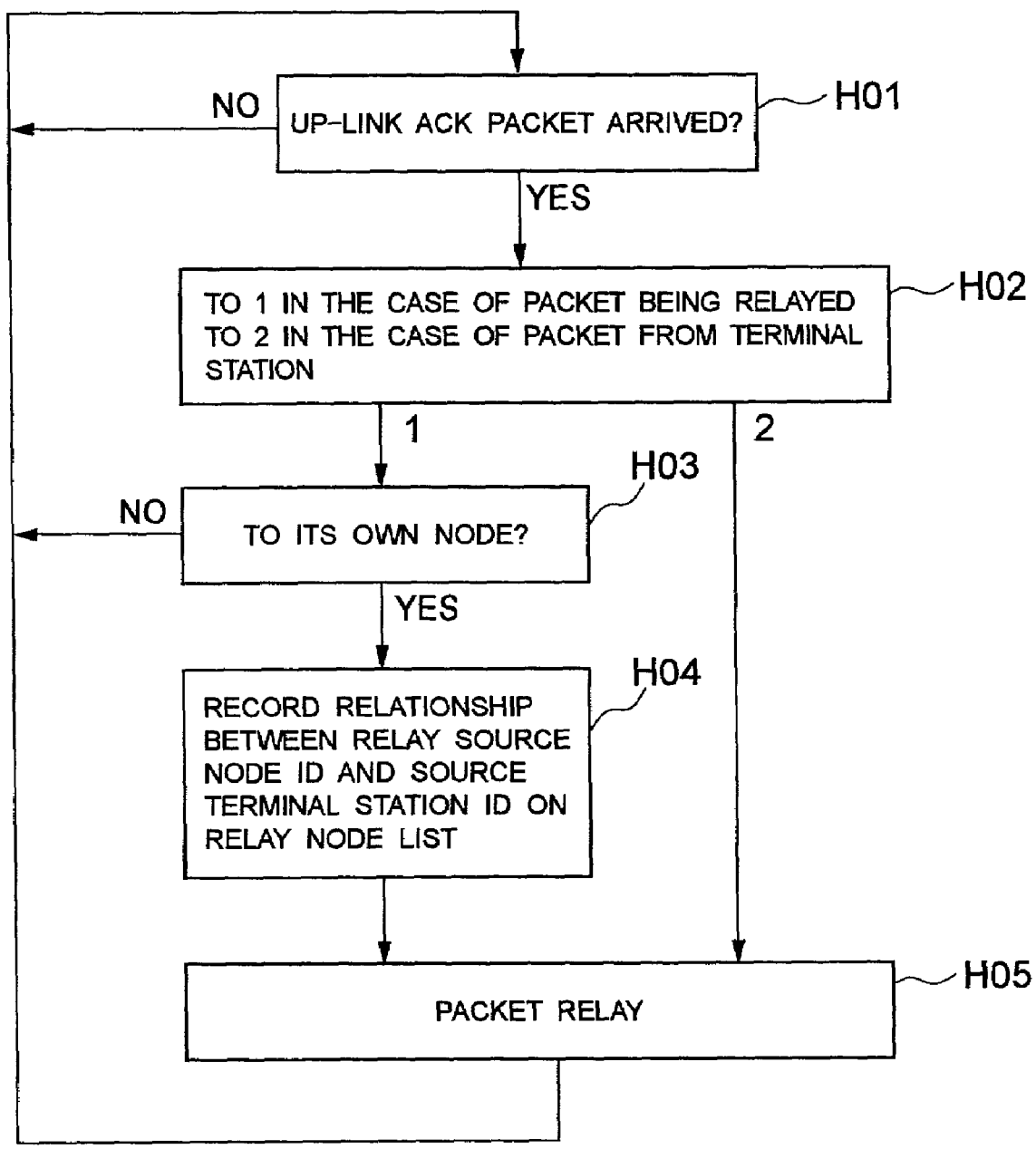
FIG. 4 is a flowchart showing an up-link ACK packet procedure performed on each relay node and core node in the data transmission method according to the embodiment of the present invention.

FIG. 4 shows an up-link ACK packet procedure performed on each relay node and the core node of the embodiment of the present invention. Each node detects arrival of the up-link ACK packet in a step H01, and it proceeds to a step H02 in the case where the up-link ACK packet is detected, and it returns to the step H01 in the case where the up-link ACK packet is not detected. In the step H02, each node determines whether the received up-link ACK packet is the packet being relayed or the packet transmitted from the terminal station. Here, the determination is made by referring to the field G03 representing the relay source node included in the up-link ACK packet, and if information set in the field G03 indicates anything other than the relay source node, each node determines that the received up-link ACK packet is the packet from the terminal station. In the case where it is determined to be the up-link ACK packet from the terminal station in the step H02, each node transmits the up-link ACK packet to the relay destination node after setting necessary information such as the relay source node ID in a step H05. In the case where the terminal station or the relay node transmits the up-link ACK packet, it may control the transmitting power of the up-link ACK packet so as to meet predetermined received power or predetermined received quality at a transmission destination node. It is possible to cut back the interference and increase the link capacity by controlling the transmitting power of the up-link ACK packet. In the case where it is determined to be the up-link ACK packet from the relay source node in the step H02, each node refers to the relay destination node ID included in the up-link ACK packet in a step H03, and it proceeds to a step H04 if its own node ID is set in the field G02, or returns to the step H01 if anything other than its own node ID is set in the field G02. In the step H04, each node obtains the information on the relay source node ID and the source terminal station ID included in the received up-link ACK packet, and records their relationship on a relay node list. In the case where the above described source terminal station ID is already registered with the relay node list, each node cancels the registration and then registers the relay source node ID and the source terminal station ID of this time. If there is no change in the relationship between the relay source node ID and the source terminal station ID, however, neither of them needs to be registered. Details of the relay node list will be described later by referring to FIG. 5. After registering it with the relay node list, each node transmits the up-link ACK packet to the relay destination node after setting necessary information such as the relay source node ID in the step H05.

Figures 5, 6:
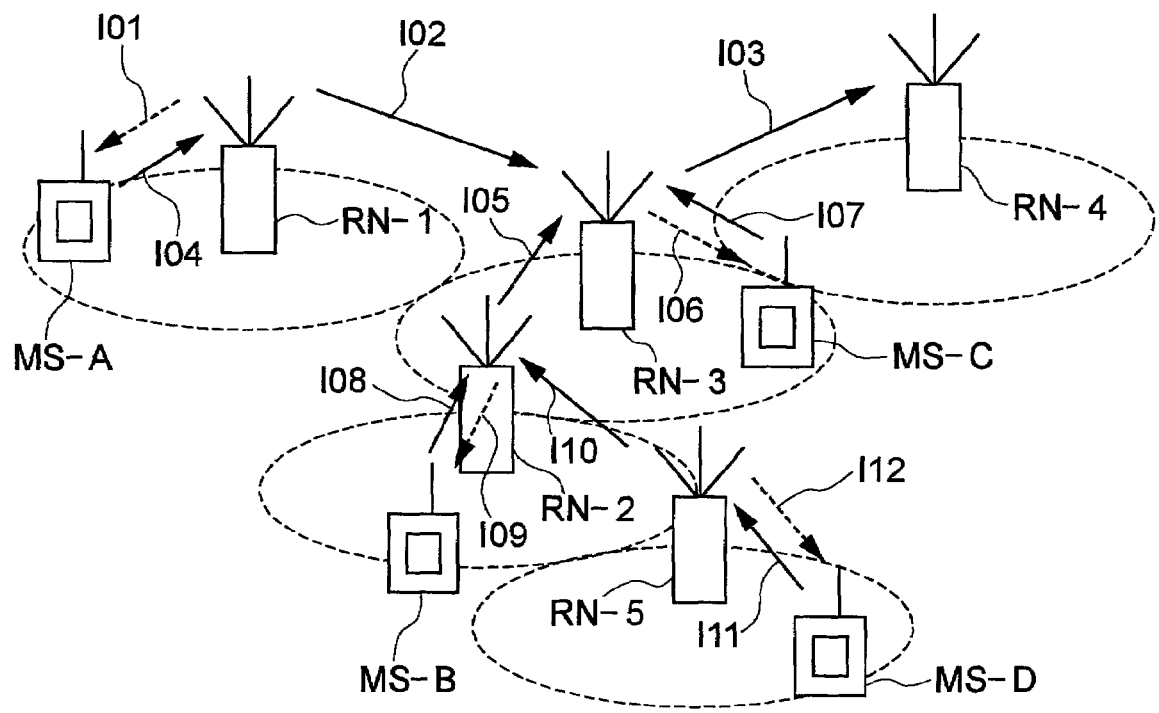
FIG. 5 is a diagram illustrating an example of the relay node list held by the relay node in the data transmission method according to the embodiment of the present invention.
FIG. 6 is a diagram illustrating how the relay node list is generated according to the embodiment of the present invention.

FIG. 5 is a diagram illustrating an example of the relay node list held by the relay node according to the embodiment of the present invention. In FIG. 5, it describes the relationship between the node ID showing a relay destination node of a down link and a destination terminal station ID showing the terminal station receiving a down-link packet. For instance, in the case where a terminal station MS-3 is specified as the destination terminal station of a certain down-link packet, the relay node holding the relay node list of FIG. 5 transmits the received down-link packet to a relay node BS-C. In the case where the node ID for the terminal station is not registered on the relay node list on the relay node or the core node, it is regarded as the down-link packet sent to the terminal station. When registering a pair of new node ID and terminal station ID on the relay node list, in the case where the terminal station ID is already registered, the registration is canceled and then the pair of the new node ID and terminal station ID are registered. However, in the case where, as a result of making an inquiry about the relationship between the node ID and the terminal station registered on the relay node list, the same pair as the new node ID and terminal station ID are already registered, neither ID needs to be registered. In the case where the pair of the node ID and the terminal station ID on the relay node list is not up-linkdated or inquired about for a fixed time or longer, the registration of the pair may be deleted.

FIG. 6 is a diagram illustrating how the relay node list according to the embodiment of the present invention is generated. It is assumed that the up-link relay destination node is already known. In FIG. 6, relay nodes RN-1, RN-2, RN-3 and RN-4 are periodically transmitting the broadcast packet respectively.

A terminal station MS-A receives the broadcast packet by way of a radio propagation path I01, and selects the relay node RN-1 as a connection node. The terminal station MS-A transmits the up-link ACK packet to the relay node RN-1 by way of a radio propagation path I04. At this time, the up-link ACK packet has the ID "MS-A" set as the source terminal station ID and the ID "RN-1" set as the relay destination node ID respectively. The relay node RN-1 receives the up-link ACK packet transmitted from the terminal station MS-A, and then transmits the up-link ACK packet to the relay node RN-3 that is the up-link relay destination node by way of a radio propagation path I02. At this time, the up-link ACK packet has the ID "RN-1" set as the relay source node ID, the ID "MS-A" set as the source terminal station ID and the ID "RN-3" set as the relay destination node ID respectively. The relay node RN-3 refers to the relay source node ID "RN-1" and the source terminal station ID "MS-A" included in the up-link ACK packet transmitted from the relay node RN-1 to register the pair of the node ID "RN-1" and the terminal station ID "MS-A" with the relay node list. The relay node RN-3 transmits the up-link ACK packet received from the relay node RN-1 to the relay node RN-4 that is the up-link relay destination node of the relay node RN-3 by way of a radio propagation path I03. At this time, the up-link ACK packet has the ID "MS-A" set as the source terminal station ID, the ID "RN-3" set as the relay source node ID and the ID "RN-4" set as the relay destination node ID respectively. The relay node RN-4 receives the up-link ACK packet transmitted from the relay node RN-3 by way of the radio propagation path I03, and registers with the relay node list held by the relay node RN-4 the source terminal station ID "MS-A" and the relay source node ID "RN-3" included in the up-link ACK packet as a pair.

In FIG. 6, a terminal station MS-B receives the broadcast packet from the relay node RN-2 by way of a radio propagation path I09, and selects the relay node RN-2 as the connection node. The terminal station MS-B transmits the up-link ACK packet to the relay node RN-2 by way of a radio propagation path I08. At this time, the up-link ACK packet has the ID "MS-B" set as the source terminal station ID and the ID "RN-2" set as the relay destination node ID respectively. The relay node RN-2 receives the up-link ACK packet transmitted from the terminal station MS-B, and then transmits the up-link ACK packet to the relay node RN-3 that is the up-link relay destination node for the relay node RN-2 by way of a radio propagation path I05. At this time, the up-link ACK packet has the ID "RN-2" set as the relay source node ID, the ID "MS-B" set as the source terminal station ID and the ID "RN-3" set as the relay destination node ID respectively. The relay node RN-3 refers to the relay source node ID "RN-2" and the source terminal station ID "MS-B" included in the up-link ACK packet transmitted from the relay node RN-2 to register the pair of the node ID "RN-2" and the terminal station ID "MS-B" with the relay node list held by the relay node RN-3. The relay node RN-3 transmits the up-link ACK packet received from the relay node RN-2 to the relay node RN-4 that is the up-link relay destination node of the relay node RN-3 by way of the radio propagation path I03. At this time, the up-link ACK packet has the ID "MS-B" set as the source terminal station ID, the ID "RN-3" set as the relay source node ID and the ID "RN-4" set as the relay destination node ID respectively. The relay node RN-4 receives the up-link ACK packet transmitted from the relay node RN-3 by way of the radio propagation path I03, and registers with the relay node list held by the relay node RN-4 the source terminal station ID "MS-B" and the relay source node ID "RN-3" included in the up-link ACK packet as a pair.

In FIG. 6, a terminal station MS-D receives the broadcast packet from the relay node RN-5 by way of a radio propagation path I12, and selects the relay node RN-5 as the connection node. The terminal station MS-D transmits the up-link ACK packet to the relay node RN-5 by way of a radio propagation path I11. At this time, the up-link ACK packet has the ID "MS-D" set as the source terminal station ID and the ID "RN-5" set as the relay destination node ID respectively. The relay node RN-5 receives the up-link ACK packet transmitted from the terminal station MS-D, and then transmits the up-link ACK packet to the relay node RN-2 that is the up-link relay destination node for the relay node RN-5 by way of a radio propagation path I10. At this time, the up-link ACK packet has the ID "RN-5" set as the relay source node ID, the ID "MS-D" set as the source terminal station ID and the ID "RN-2" set as the relay destination node ID respectively.

The relay node RN-2 refers to the relay source node ID "RN-5" and the source terminal station ID "MS-D" included in the up-link ACK packet transmitted from the relay node RN-5 to register the pair of the node ID "RN-5" and the terminal station ID "MS-D" with the relay node list held by the relay node RN-2. The relay node RN-2 transmits the up-link ACK packet received from the relay node RN-5 to the relay node RN-3 that is the up-link relay destination node of the relay node RN-2 by way of the radio propagation path I05. At this time, the up-link ACK packet has the ID "MS-D" set as the source terminal station ID, the ID "RN-2" set as the relay source node ID and the ID "RN-3" set as the relay destination node ID respectively. The relay node RN-3 refers to the relay source node ID "RN-2" and the source terminal station ID "MS-D" included in the up-link ACK packet transmitted from the relay node RN-2 to register the pair of the node ID "RN-2" and the terminal station ID "MS-D" with the relay node list held by the relay node RN-3. The relay node RN-3 transmits the up-link ACK packet received from the relay node RN-2 to the relay node RN-4 that is the up-link relay destination node of the relay node RN-3 by way of the radio propagation path I03. At this time, the up-link ACK packet has the ID "MS-D" set as the source terminal station ID, the ID "RN-3" set as the relay source node ID and the ID "RN-4" set as the relay destination node ID respectively.

The relay node RN-4 receives the up-link ACK packet transmitted from the relay node RN-3 by way of the radio propagation path I03, and registers with the relay node list held by the relay node RN-4 the source terminal station ID "MS-D" and the relay source node ID "RN-3" included in the up-link ACK packet as a pair.

In FIG. 6, a terminal station MS-C receives the broadcast packet from the relay node RN-3 by way of a radio propagation path I06, and selects the relay node RN-3 as the connection node. The terminal station MS-C transmits the up-link ACK packet to the relay node RN-3 by way of a radio propagation path I07. At this time, the up-link ACK packet has the ID "MS-C" set as the source terminal station ID and the ID "RN-3" set as the relay destination node ID respectively. The relay node RN-3 receives the up-link ACK packet transmitted from the terminal station MS-C, and then transmits the up-link ACK packet to the relay node RN-4 that is the up-link relay destination node for the relay node RN-3 by way of the radio propagation path I03. At this time, the up-link ACK packet has the ID "RN-3" set as the relay source node ID, the ID "MS-C" set as the source terminal station ID and the ID "RN-4" set as the relay destination node ID respectively. The relay node RN-4 receives the up-link ACK packet transmitted from the relay node RN-3 by way of the radio propagation path I03, and registers with the relay node list held by the relay node RN-4 the source terminal station ID "MS-C" and the relay source node ID "RN-3" included in the up-link ACK packet as a pair.

FIG. 7 is a diagram illustrating the relay node list on the relay node RN-2 generated by the relay node list generation procedure described by using FIG. 6. As shown in FIG. 7, the list indicating the down-link relay destination node to relay the down-link packet for each terminal station is generated on the relay node RN-2 shown in FIG. 6, and accordingly, selection of the down-link relay route for each terminal station is autonomously implemented in the relay node RN-2.

FIG. 8 is a diagram illustrating the relay node list on the relay node RN-3 generated by the relay node list generation procedure described by using FIG. 6. As shown in FIG. 8, the list indicating the down-link relay destination node to relay the down-link packet for each terminal station is generated on the relay node RN-3 shown in FIG. 6, and accordingly, selection of the down-link relay route for each terminal station is autonomously implemented in the relay node RN-3.

FIG. 9 is a diagram illustrating the relay node list on the relay node RN-4 generated by the relay node list generation procedure described by using FIG. 6. As shown in FIG. 9, the list indicating the down-link relay destination node to relay the down-link packet for each terminal station is generated on the relay node RN-4 shown in FIG. 6, and accordingly, selection of the down-link relay route for each terminal station is automously implemented in the relay node RN-4.

Figures 10, 11:
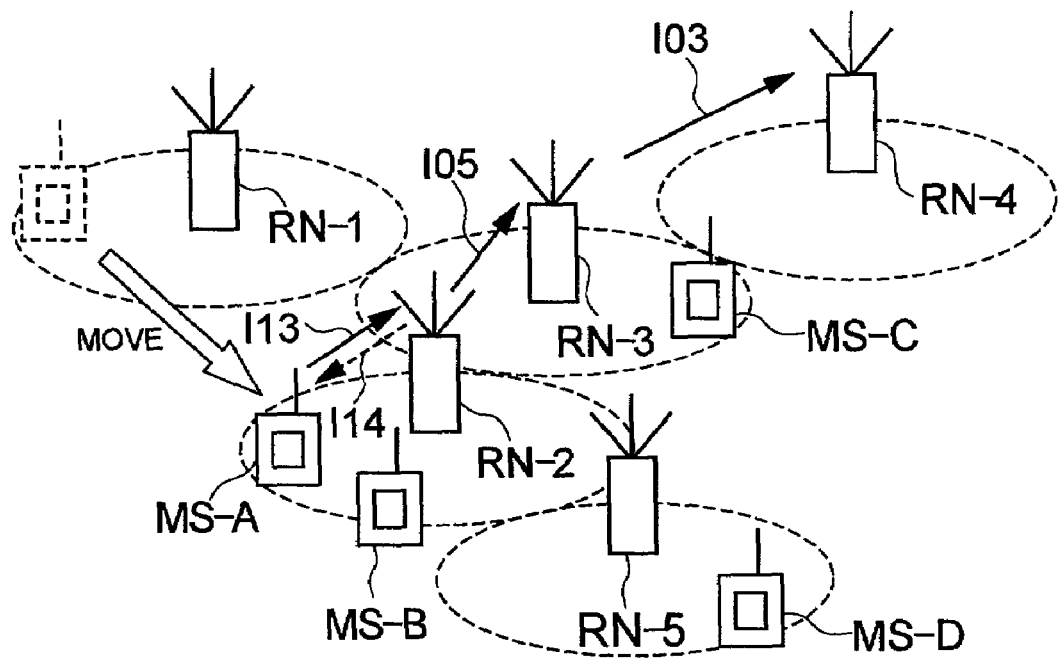
FIG. 10 is a diagram showing how the relay node list is generated in the case where the terminal station has moved in the data transmission method according to the embodiment of the present invention.
FIG. 11 is a diagram illustrating the relay node list that is generated on the relay node in the case where the terminal station has moved in the data transmission method according to the embodiment of the present invention.

Next, FIG. 10 is a diagram showing how the relay node list is generated in the case where the terminal station MS-A in FIG. 6 has moved. FIG. 10 shows the case where the terminal station MS-A moves from the area covered by the relay node RN-1 to the area covered by the relay node RN-2.

In FIG. 10, the terminal station MS-A receives the broadcast packet from the relay node RN-2 by way of a radio propagation path I14, and selects the relay node RN-2 as the connection node. The terminal station MS-A transmits the up-link ACK packet to the relay node RN-2 by way of a radio propagation path I13. At this time, the up-link ACK packet has the ID "MS-A" set as the source terminal station ID and the ID "RN-2" set as the relay destination node ID respectively. The relay node RN-2 receives the up-link ACK packet transmitted from the terminal station MS-A, and then transmits the up-link ACK packet to the relay node RN-3 that is the up-link relay destination node for the relay node RN-2 by way of the radio propagation path I05. At this time, the up-link ACK packet has the ID "RN-2" set as the relay source node ID, the ID "MS-A" set as the source terminal station ID and the ID "RN-3" set as the relay destination node ID respectively. The relay node RN-3 refers to the relay source node ID "RN-2" and the source terminal station ID "MS-A" included in the up-link ACK packet transmitted from the relay node RN-2 to register the pair of the node ID "RN-2" and the terminal station ID "MS-A" with the relay node list held by the relay node RN-3. Here, while the terminal station MS-A pairing off with the relay node RN-1 is already registered with the relay node list held by the relay node RN-3 as shown in FIG. 8, the terminal station MS-A pairs off with the relay node RN-2 this time, so that the relay node RN-3 changes it by deleting the ID "MS-A" registered for the ID "RN-1" to newly have the ID "RN-2" and the ID "MS-A" as a pair. The relay node RN-3 transmits the up-link ACK packet received from the relay node RN-2 to the relay node RN-4 that is the up-link relay destination node of the relay node RN-3 by way of the radio propagation path I03. At this time, the up-link ACK packet has the ID "MS-A" set as the source terminal station ID, the ID "RN-3" set as the relay source node ID and the ID "RN-4" set as the relay destination node ID respectively. The relay node RN-4 receives the up-link ACK packet transmitted from the relay node RN-3 by way of the radio propagation path I03, and attempts to register with the relay node list held by the relay node RN-4 the source terminal station ID "MS-A" and the relay source node ID "RN-3" included in the up-link ACK packet as a pair. However, the relay node RN-4 does not need to newly register it since the pair of the ID "MS-A" and the ID "RN-3" is already registered with the relay node list held by the relay node RN-4 as shown in FIG. 9.

FIG. 11 shows the relay node list that is generated on the relay node RN-3 in the case where the terminal station MS-A moves from the area covered by the relay node RN-1 to the area covered by the relay node RN-2 as shown in FIG. 10. As shown in FIG. 11, the relay node RN-3 shown in FIG. 10 cancels the registration of the terminal station MS-A pairing off with the relay node RN-1 and registers the ID "MS-A" so that it pairs off with the relay node RN-2. There are cases where cancellation of the terminal station MS-A pairing off with the relay node RN-1 is performed after some time has elapsed. In this case, the two relay routes by way of the relay nodes RN-1 and RN-2 is set to one terminal station MS-A, which receives the packets from those two relay nodes RN-1 and RN-2 so as to have the effect of site diversity.

As above, according to the embodiment of the present invention, it is possible to adaptably select the down-link relay route even in the case where the terminal station has moved. The shorter a transmission cycle of the broadcast packet is, the faster move of the terminal station can be the subject of implementation of the down-link relay route selection.

In addition, a radio relay type cellular network as a precondition has the effect of allowing more stable communication compared with an ad hoc network wherein a moving terminal serves concurrently as the relay center, since the relay nodes are deployed fixedly as infrastructure.

Moreover, it is feasible, by controlling the transmitting power of an up-link data packet or a down-link data packet, to cut back interference given to the surrounding nodes and terminal stations, whereby it consequently has the effect of allowing the link capacity in the entire system to be improved.

Figure 12:
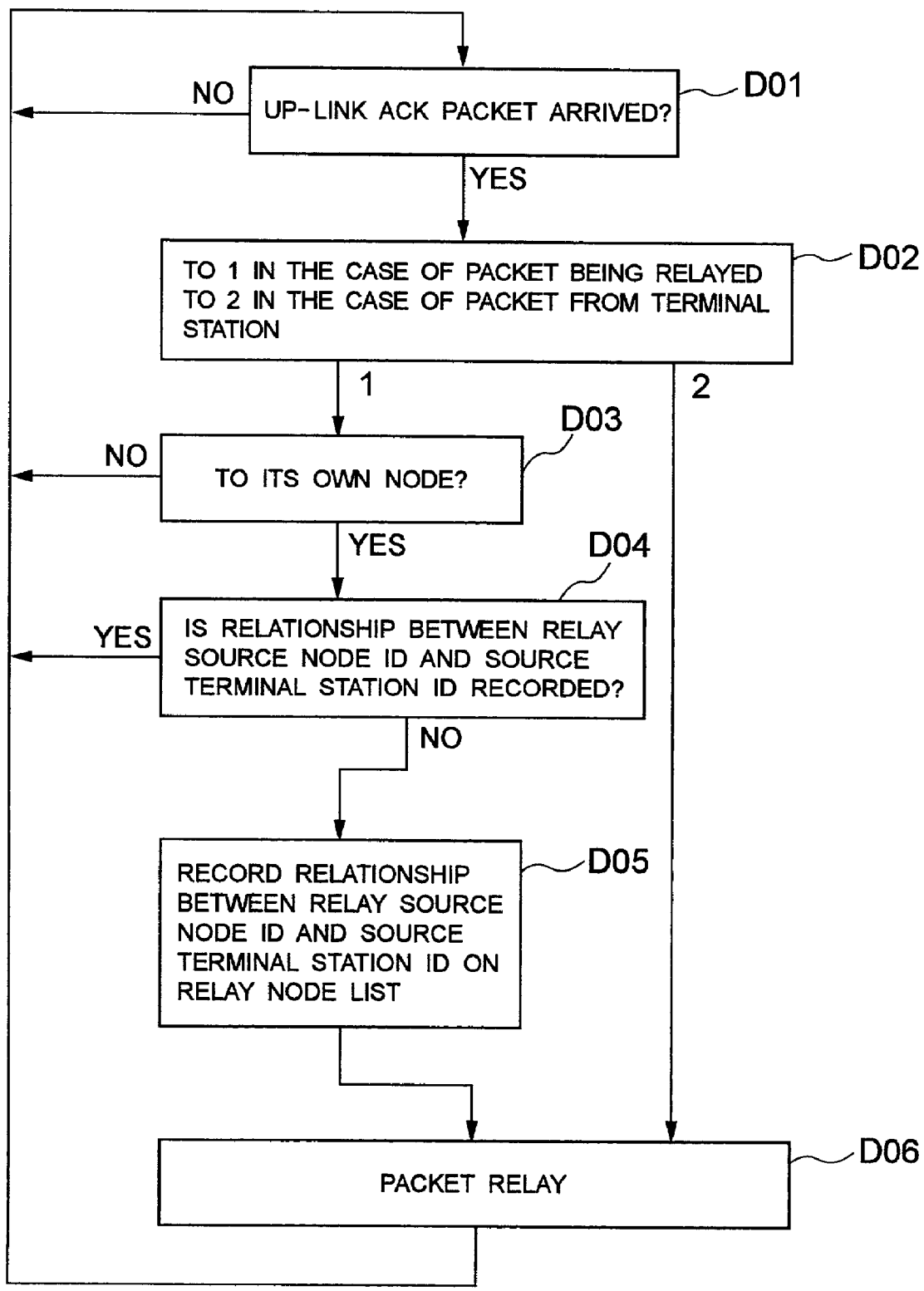
FIG. 12 is a flowchart showing another example of the up-link ACK packet procedure performed on each relay node and core node in the data transmission method according to the embodiment of the present invention.

FIG. 12 is a flowchart showing another example of the up-link ACK packet procedure performed on each relay node and core node according to the embodiment of the present invention. As shown in FIG. 12, each node detects arrival of the up-link ACK packet in a step D0, and it proceeds to a step D02 in the case where the up-link ACK packet is detected, and it returns to the step D01 in the case where the up-link ACK packet is not detected. In the step D02, each node determines whether the received up-link ACK packet is the packet being relayed or the packet transmitted from the terminal station. Here, the determination is made by referring to the field G03 representing the relay source node included in the ACK packet, and if information set in the field G03 indicates anything other than the relay source node, each node determines that the received up-link ACK packet is the packet from the terminal station. In the case where it is determined to be the up-link ACK packet from the terminal station in the step D02, each node transmits the up-link ACK packet to the relay destination node after setting necessary information such as the relay source node ID in a step D06. In the case where the terminal station or the relay node transmits the up-link ACK packet, it may control the transmitting power of the up-link ACK packet so as to meet predetermined received power or predetermined received quality at the transmission destination node. It is possible to cut back the interference and increase the link capacity by controlling the transmitting power of the up-link ACK packet.

In the case where it is determined to be the up-link ACK packet from the relay source node in the step D02, each node refers to the relay destination node ID included in the up-link ACK packet in a step D03, and it proceeds to a step D04 if its own node ID is set in the field G02, or returns to the step D01 if anything other than its own node ID is set in the field G02. In the step D04, each node obtains the information on the relay source node ID and the source terminal station ID included in the received up-link ACK packet, and determines whether or not their relationship is already recorded with the relay node list. In the case where, in the step D04, it is determined that the pair of the relay source node ID and the source terminal station ID included in the received up-link ACK packet is already registered, each node does not relay the packet and returns to the step D01. In the case where it is not registered, each node registers the relationship between the relay source node ID and the source terminal station ID with the relay node list in a step D05. Here, in the case where the above described source terminal station ID is already registered with the relay node list, each node cancels the registration thereof and then registers the pair of the relay source node ID and the source terminal station ID of this time. After registering it with the relay node list in the step D05, each node transmits the up-link ACK packet to the relay destination node after setting the necessary information such as the relay source node ID in the step D06.

Figure 13:
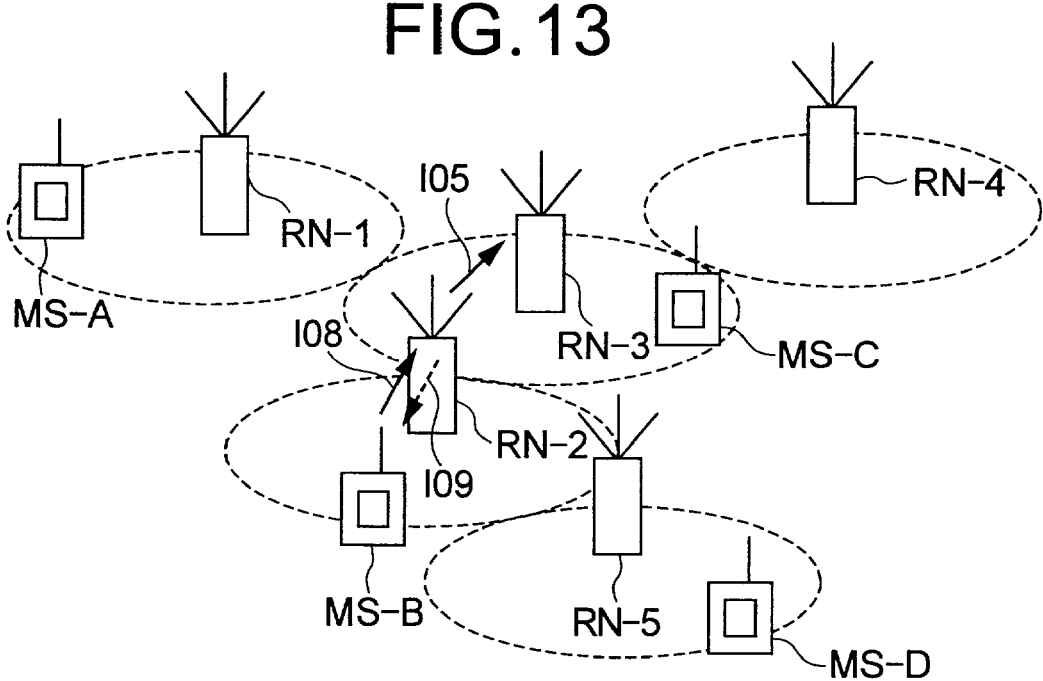
FIG. 13 is a diagram concretely illustrating how the relay node list is generated in the data transmission method according to the embodiment of the present invention.

FIG. 13 is a diagram concretely illustrating how the relay node list is generated according to the up-link ACK packet procedure shown in FIG. 12. In FIG. 13, placement of the terminal stations and relay nodes equal to that in FIG. 6 is assumed, and it represents a situation where the terminal stations MS-A, MS-B, MS-D and MS-C transmit or relay and transmit the up-link ACK packets to the relay nodes RN-1, RN-2, RN-3, RN-4 and RN-5 respectively, and then the terminal station MS-B receives the broadcast packet to transmit the up-link ACK packet again. In FIG. 13, the terminal station MS-B receives the broadcast packet from the relay node RN-2 by way of the radio propagation path I09, and selects the relay node RN-2 as the connection node. The terminal station MS-B transmits the up-link ACK packet to the relay node RN-2 by way of the radio propagation path I08. At this time, the up-link ACK packet has the ID "MS-B" set as the source terminal station ID and the ID "RN-2" set as the relay destination node ID respectively. The relay node RN-2 receives the up-link ACK packet transmitted from the terminal station MS-B, and then transmits the up-link ACK packet to the relay node RN-3 that is the up-link relay destination node for the relay node RN-2 by way of the radio propagation path I05. At this time, the up-link ACK packet has the ID "RN-2" set as the relay source node ID, the ID "MS-B" set as the source terminal station ID and the ID "RN-3" set as the relay destination node ID respectively. The relay node RN-3 refers to the relay source node ID "RN-2" and the source terminal station ID "MS-B" included in the up-link ACK packet transmitted from the relay node RN-2 to check whether or not the pair of the node ID "RN-2" and the terminal station ID "MS-B" is already registered with the relay node list held by the relay node RN-3.

As shown in FIG. 8, the pair of the ID "RN-2" and the ID "MS-B" is already registered with the relay node list held by the relay node RN-3. And according to this example of relay node list generation, in the case where, as shown in FIG. 12, the pair of the relay source node ID and the source terminal station ID included in the relayed and transmitted up-link ACK packet is already registered with the relay node list, the relay node RN-3 does not relay and transmit the up-link ACK packet to the relay node(relay node RN-4) of higher order. Thus, it becomes possible to transmit the up-link ACK packet only in the case where the relay route needs to be changed, and traffic for transmitting the up-link ACK packet can be reduced, thus allowing the interference to be cut back and the link capacity in the entire system to be improved.

Moreover, when generating the relay node list in the embodiment of the present invention, it is also possible to generate the relay node list with the up-link packets other than the up-link ACK packet. Here, the up-link packets refer to up-link data packets transmitted by the terminal station, which are transmitted none the less whether or not the broadcast packet is received.

Figure 14:
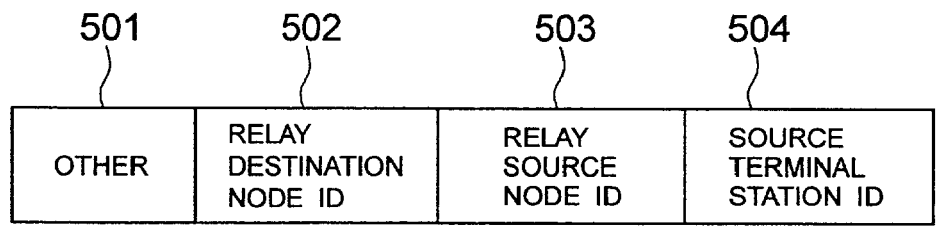
FIG. 14 is a schematic diagram showing a configuration of an up-link packet in the data transmission method according to the embodiment of the present invention.

FIG. 14 is a schematic diagram showing the configuration of the up-link packet. In FIG. 14, the up-link packet is comprised of a field 502 showing the relay destination node ID, a field 503 showing the relay source node ID, a field 504 showing the source terminal station ID and the other field 501. In the relay node, the up-link relay destination node ID is set as the relay destination node ID, its own node ID is set as the relay source node ID, and the ID of the terminal station having transmitted the up-link packet is set as the source terminal station ID. In the case where the terminal station transmits the up-link packet, the terminal station sets the information, as the relay source node ID, indicating that the packet was transmitted by the station. It is also possible to simultaneously set a plurality of the relay destination node IDs in the field 502. The other field 501 has a pilot, an up-link and down-link indicator, a packet ID, data and so on set. The order of the fields may change. The other field 501 may be divided and placed.

In FIGS. 4 and 12 showing the ACK packet procedure respectively, the relay node list is generated by replacing the portion equivalent to the up-link ACK packet with the up-link packet shown in FIG. 14.

Figure 15:
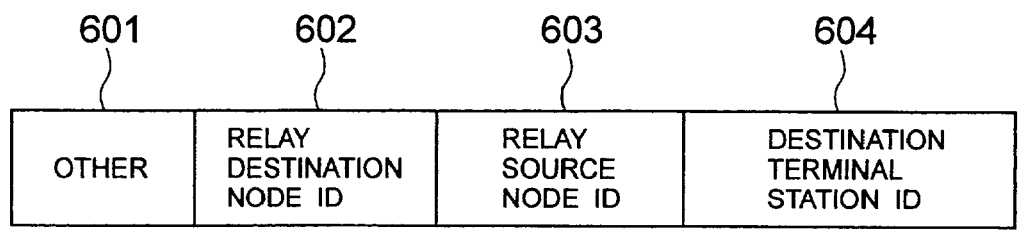
FIG. 15 is a schematic diagram showing a configuration of a down-link packet in the data transmission method according to the embodiment of the present invention.

Next, the down-link packet relay and transmission method according to the embodiment of the present invention will be described. FIG. 15 is a schematic diagram showing the field configuration of the down-link packet. In FIG. 15, the down-link packet is comprised of a field 602 showing the relay destination node ID, a field 603 showing the relay source node ID, a field 604 showing the destination terminal station ID and the other field 601. In the case where a certain relay node relays and transmits the down-link packet, the relay node determines the relay destination node ID corresponding to the destination terminal station ID from the relay node list, and then sets the relay destination node ID in the relay destination node ID field 602, sets the destination terminal station ID in the destination terminal station ID field 604, and sets the node ID of the relay node in the relay source node ID field 603. In the case where a certain relay node transmits the down-link packet directly to the terminal station, the relay node sets the information dedicated to indication thereof in the relay destination node ID field 602. The other field 601 has a pilot, an up-link and down-link link indicator, a packet ID, data and so on stored. The order of the fields may change. The other field 601 may be divided and placed.

Figure 16:
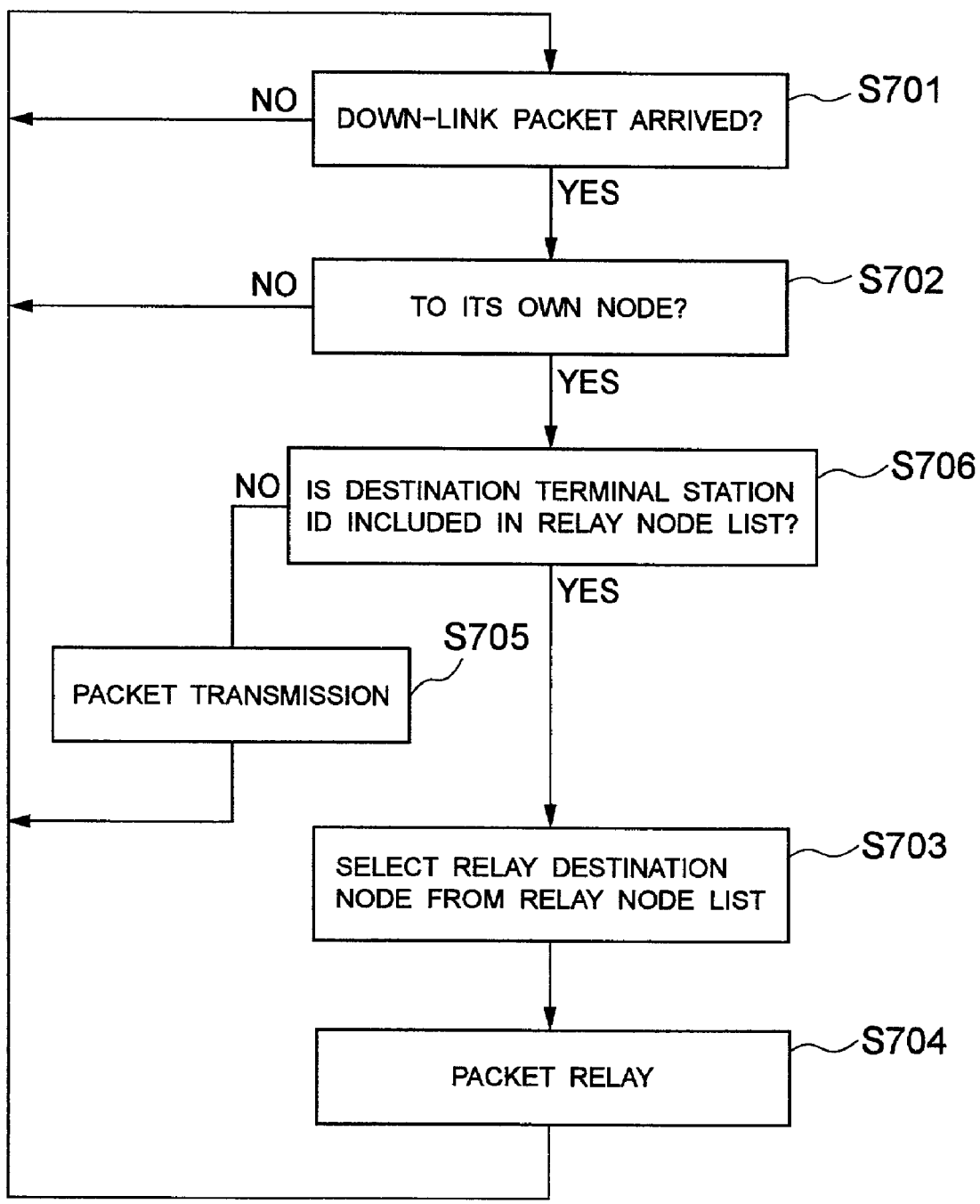
FIG. 16 is a flowchart showing the relay and transmission process of the down-link packet in the data transmission method according to the embodiment of the present invention.

FIG. 16 is a flowchart showing the relay transmission process of the down-link packet shown in FIG. 15, and this process is one executed on the core node and the relay node. In FIG. 16, each node detects arrival of the down-link packet in a step S701, and it proceeds to a step S702 if the down-link packet arrives, and it returns to the step 701 if the arrival of the packet is not detected. In the step S702, each node determines whether or not the relay destination node ID included in the down-link packet is its own node ID, and if its own node ID is set in the field 602, it proceeds to a step S706, and if not, it returns to the step S701. In the step S706, each node checks the destination terminal station ID indicating the destination of the down-link packet, and determines whether or not the destination terminal station ID is included in the relay node list. In the case where the destination terminal station ID is included in the relay node list, it proceeds to a step S703, and if the ID is not included therein, it proceeds to a step S705. In the step S703, each node selects from the relay node list the node ID to pair off with the destination terminal station, sets the node ID as the relay destination node ID on the down-link packet. In a step 704, each node transmits the down-link packet to the relay destination node selected in the step S703. Here, the down-link packet to be relayed and transmitted has its own node ID set as the relay source node ID and also has the destination terminal station ID and the relayed data and so on set respectively. When the core node or the relay node transmits the down-link packet, it may control the transmitting power of the down-link packet so as to meet predetermined received power or predetermined received quality at a transmission destination node or terminal station. It is possible, by controlling the transmitting power of the down-link packet, to cut back the interference given to the surroundings, whereby allowing high link utilization to be attained.

On the other hand, in the case where the destination terminal station ID is not included in the relay node list in the step S706, each node transmits the down-link packet directly to the terminal station in a step S705. At this time, the down-link packet has its own node ID set as the relay source node ID and also has the information indicating that the down-link packet is transmitted to the terminal station set in the relay destination node ID field 602. In addition, the down-link packet has the destination terminal station ID, the down-link data and so on set respectively.

Figure 17:
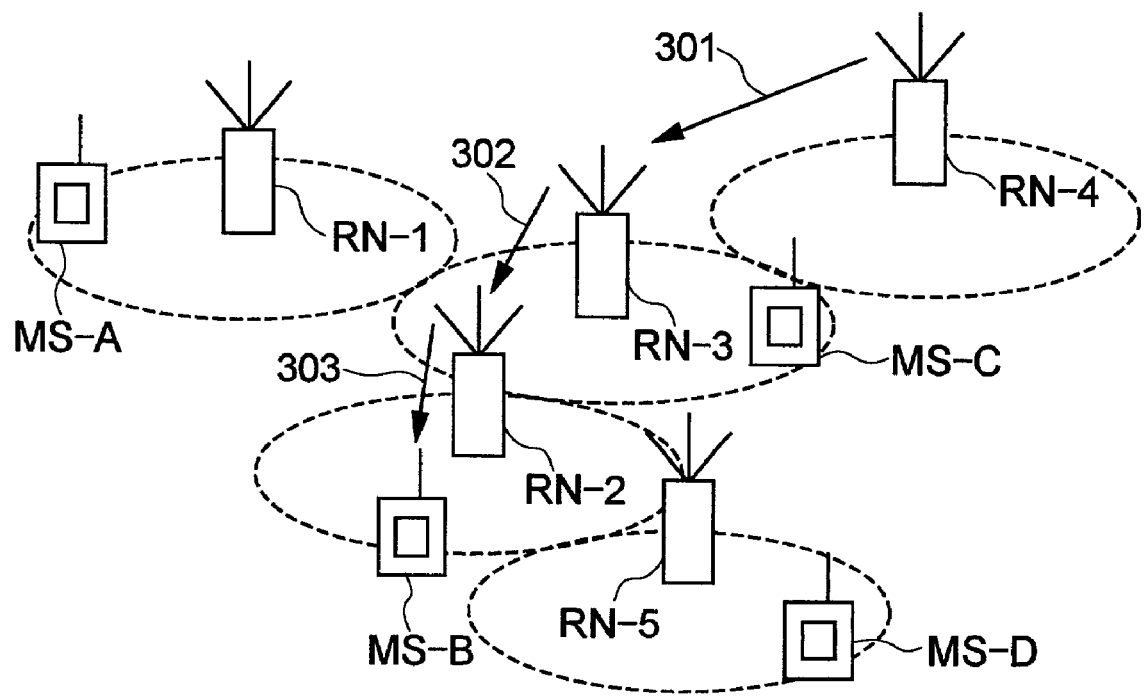
FIG. 17 is a diagram concretely illustrating the down-link packet relay operation in the data transmission method according to the embodiment of the present invention.
Figure 18:
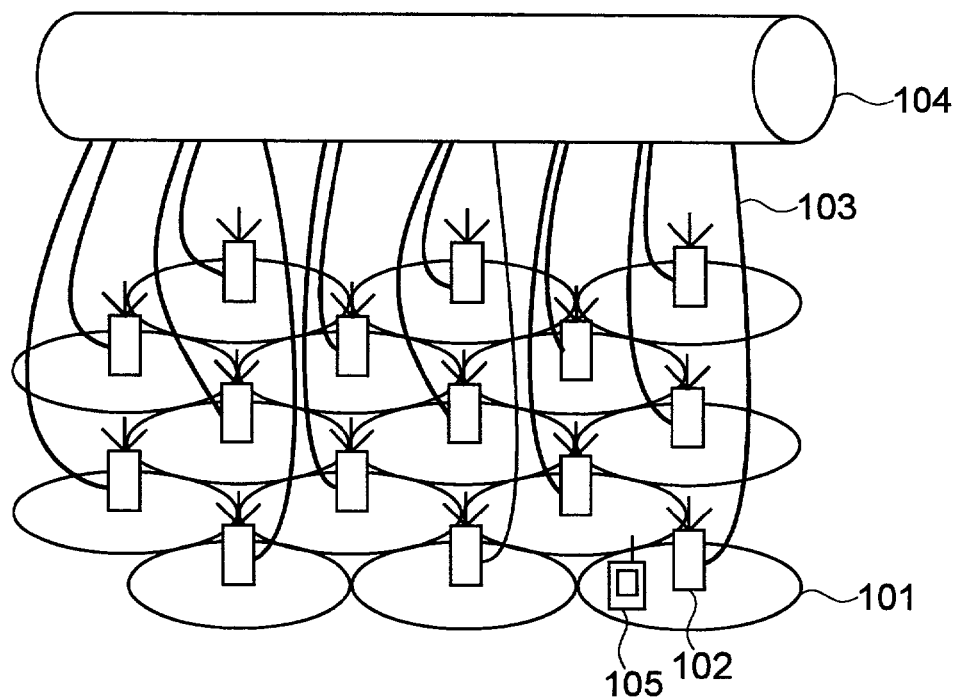
FIG. 18 is a diagram illustrating a cell configuration of a conventional cellular system.
Figure 19:
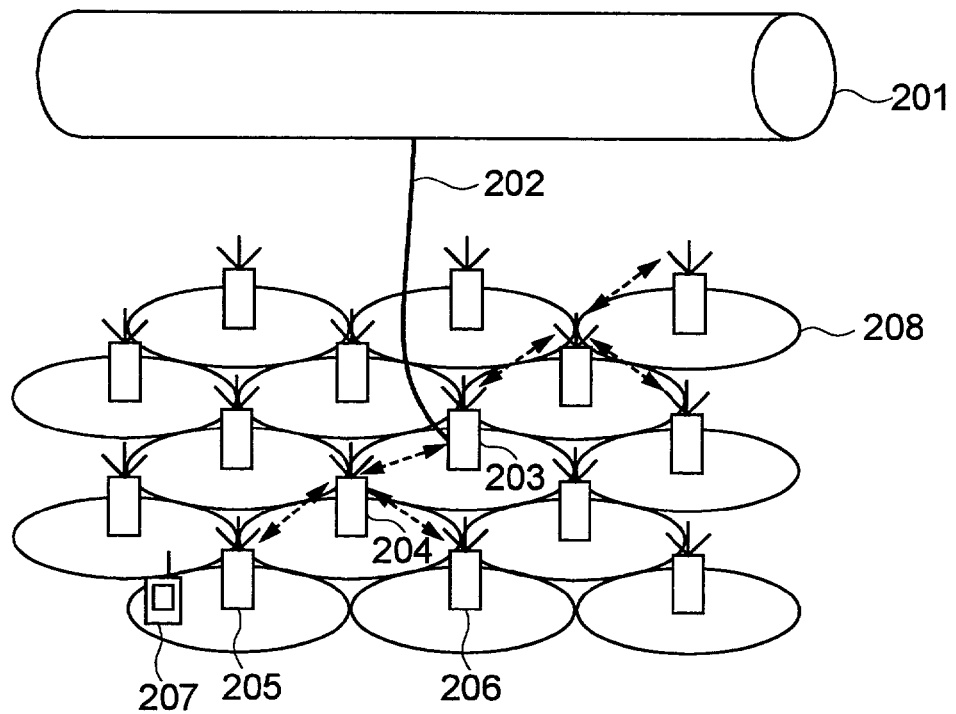
FIG. 19 is a diagram illustrating an example of a cell configuration of a radio relay type cellular system.

FIG. 17 is a diagram concretely illustrating the down-link packet relay operation by the down-link packet relay transmission shown in FIG. 16. In FIG. 17, placement of the terminal stations and relay nodes that is the same as FIG. 6 is assumed, and the relay node lists to the terminal stations MS-A, MS-B, MS-C and MS-D are already generated on the relay nodes RN-1, RN-2, RN-3 and RN-4. Now, the down-link packet sent to the terminal station MS-B arrives at the relay node RN-4. The relay node RN-4 refers to the relay node list shown in FIG. 9, and it grasps that the relay destination node to pair off with the terminal station MS-B is the relay node RN-3. The relay node RN-4 relays the down-link packet to the relay node RN-3. Here, the relay node RN-4 sets the ID "RN-4" as the relay source node ID, sets the ID "RN-3" as the relay destination node ID, and sets the ID "MS-B" as the destination terminal station ID on the down-link packet to be relayed. In addition, the other information (transmission data or the like) included in the down-link packet sent to the terminal station MS-B having arrived at the relay node RN-4 is also set on the down-link packet. After the relay node RN-4 transmits the down-link packet to the relay node RN-3 by way of a radio propagation path 301, the relay node RN-3 receives the down-link packet. The relay node RN-3 checks the destination terminal station of the down-link packet transmitted from the relay node RN-4, and checks whether or not the terminal station is included in the relay node list held by the relay node RN-3 shown in FIG. 8. As the terminal station MS-B pairs off with the relay node RN-2 as shown in FIG. 8, the relay node RN-3 transmits the down-link packet to the relay node RN-2 just as in the case where the relay node RN-4 relayed and transmitted the down-link packet to the relay node RN-3. The relay node RN-2 likewise checks whether or not the terminal station MS-B is registered with the relay node list held by the relay node RN-2 shown in FIG. 7. As the ID "MS-B" that is the ID of the destination terminal station MS-B is not registered with the relay node list held by the relay node RN-2 as shown in FIG. 7, the relay node RN-2 determines that the terminal station MS-B belongs to the area of its own node, and transmits the down-link packet to the terminal station MS-B. At this time, on the down-link packet to be sent to the terminal station MS-B, the relay node RN-2 sets the ID "RN-2" as the relay source node ID, sets the information dedicated to the indication of transmission to the terminal station in the relay destination node ID field 602, and sets the ID "MS-B" as the destination terminal station ID. In addition, the relay node RN-2 also sets a data signal or the like included in the down-link packet received by the relay node RN-2 on the down-link packet as appropriate.

The terminal station MS-B receives the down-link packet from the relay node RN-2, confirms that it is the packet sent to its own terminal and then demodulates the data.

As above, according to the embodiment of the present invention, it is possible to adaptably select the down-link relay route even in the case where the terminal station has moved. The shorter the transmission cycle of the broadcast packet is, the faster move of the terminal station can be the subject of implementation of the down-link relay route selection.

In addition, a radio relay type cellular network as a precondition has the effect of allowing more stable communication compared with the ad hoc network wherein the moving terminal serves concurrently as the relay center, since the relay nodes are deployed fixedly as infrastructure.

Moreover, it is feasible, by controlling the sending power of the up-link data packet or the down-link data packet, to cut back interference given to the surrounding nodes and terminal stations, whereby it consequently has the effect of allowing the link capacity in the entire system to be improved.

According to the present invention, the information on the relay route of the up-link packet is held as the relay node list on the core node and the relay node, and the relay route of the down-link packet is selected based on the above described information recorded on the relay node list, so that it has the advantage of allowing selection of the appropriate down-link relay route according to the location of the terminal and further allowing selection of the down-link relay route to be automously implemented in each of the relay nodes.

In addition, the present invention has the effect that, in the case where the terminal station moves, the relay route of the down-link packet to the terminal station can be changed as appropriate following the move.

What is claimed is:

1. A data transmission method in a relay transmission type radio network including a core node connected to a wire network, relay nodes relaying a down-link packet transmitted from said core node and an up-link packet directed toward said core node and a terminal station capable of transmission and reception of packet with both of said core node and said relay node, comprising:

a registration step for registering with a relay node list held by the node, as a pair, ID information on said terminal station and a relay source node included in the up-link packet transmitted by said terminal station, in each of said core node and said relay node;

a selection step for selecting a down-link relay route of the down-link packet addressed to said terminal station on the basis of said relay node list, in each of said core node and said relay node;

a step for periodically transmitting a broadcast packet to said terminal station in each of said core node and said relay node;

a connection node determination step for receiving said broadcast packet and determining a connection node out of said core node and said relay node in said terminal station;

a step for transmitting to said connection node an up-link ACK packet, as said up-link packet, including the ID information on said terminal station and directed toward said core node following a predetermined up-link relay route in said terminal station; and a step for, in each of said relay nodes, setting on said received up-link ACK packet the ID information on the relay node as the ID information on said relay source node and transmitting it to a relay destination node, wherein, in the relay node having received said up-link ACK packet, if the pair of the ID information on said terminal station and said relay source node included in the up-link ACK packet is already registered with said relay node list held by the relay node, the up-link ACK packet is not transmitted to the relay destination node.

2. The data transmission method according to claim 1, wherein said connection node determination step determines as said connection node a node that transmitted said broadcast packet having the highest received power or the best received quality.

3. The data transmission method according to claim 1, wherein said broadcast packet includes the ID information on the node that transmitted the broadcast packet.

4. The data transmission method according to claim 1 wherein said broadcast packet includes the ID information on the core node on which the node that transmitted the broadcast packet is dependent.

5. The data transmission method according to claim 1 wherein the pair of the ID information on said terminal station and said relay source node registered with said relay node list is deleted after a predetermined time elapses from the registration thereof.

6. The data transmission method according to claim 1 wherein said broadcast packet is transmitted with predetermined transmitting power.

7. The data transmission method according to claim 1, wherein said up-link ACK packet is transmitted by controlling the transmitting power thereof so as to satisfy predetermined received power or predetermined received quality at the relay destination node thereof.

8. The data transmission method according to claim 1 wherein said down-link packet is transmitted by controlling the transmitting power thereof so as to satisfy predetermined received power or predetermined received quality at the relay node or said terminal station receiving the down-link packet.

9. The data transmission method according to claim 1, comprising a step for, in each of said relay nodes, setting on said received up-link ACK packet the ID information on the relay node as the ID information on said relay source node and transmitting it to relay destination nodes.

10. The data transmission method according to claim 9, wherein, in the relay node having received said up-link packet, if the pair of the ID information on said terminal station and said relay source node included in the up-link packet is already registered with said relay node list held by the relay node, the up-link packet is not transmitted to the relay destination node.

11. The data transmission method according to claim 9, wherein the pair of the ID information on said terminal station and said relay source node registered with said relay node list is deleted after a predetermined time elapses from the registration thereof.

12. The data transmission method according to claim 9, wherein said up-link packet is transmitted by controlling the transmitting power thereof so as to satisfy predetermined received power or predetermined received quality at the relay destination node thereof.

13. The data transmission method according to claim 9, wherein said registration step immediately registers the ID information on said terminal station and said relay source node included in said received up-link packet as a pair, and if the ID information on said terminal station is already registered with said relay node list as a pair with the ID information different from that of the relay source node, the ID information on the terminal station registered as the pair with the different ID information is deleted immediately or after a predetermined time elapses.

14. A data transmission method in a relay transmission type radio network including a core node connected to a wire network, relay nodes relaying a down-link packet transmitted from said core node and an up-link packet directed toward said core node and a terminal station capable of transmission and reception of packet with both of said core node and said relay node, comprising:

a registration step for registering with a relay node list held by the node, as a pair, ID information on said terminal station and a relay source node included in the up-link packet transmitted by said terminal station, in each of said core node and said relay node;

a selection step for selecting a down-link relay route of the down-link packet addressed to said terminal station on the basis of said relay node list, in each of said core node and said relay node;

a step for periodically transmitting a broadcast packet to said terminal station in each of said core node and said relay node;

a connection node determination step for receiving said broadcast packet and determining a connection node out of said core node and said relay node in said terminal station;

a step for transmitting to said connection node an up-link ACK packet, as said up-link packet, including the ID information on said terminal station and directed toward said core node following a predetermined up-link relay route in said terminal station; and a step for, in each of said relay nodes, setting on said received up-link ACK packet the ID information on the relay node as the ID information on said relay source node and transmitting it to a relay destination node, wherein said registration step immediately registers the ID information on said terminal station and said relay source node included in said received up-link ACK packet as a pair, and if the ID information on said terminal station is already registered with said relay node list as a pair with the ID information different from that of the relay source node, the ID information on the terminal station registered as the pair with the different ID information is deleted immediately or after a predetermined time elapses.

15. A data transmission method in a relay transmission type radio network including a core node connected to a wire network, relay nodes relaying a down-link packet transmitted from said core node and an up-link packet directed toward said core node and a terminal station capable of transmission and reception of packet with both of said core node and said relay node, comprising:

a registration step for registering with a relay node list held by the node, as a pair, ID information on said terminal station and a relay source node included in the up-link packet transmitted by said terminal station, in each of said core node and said relay node;

a selection step for selecting a down-link relay route of the down-link packet addressed to said terminal station on the basis of said relay node list, in each of said core node and said relay node, wherein said selection step comprises:

a step for checking the ID information on said terminal station included in said down-link packet addressed to said terminal station and detecting the relay node that pairs off with said terminal station from said relay node list; and a step for transmitting said down-link packet to the detected relay node in the case where the relay node that pairs off with said terminal station is detected and transmitting said down-link packet directly to said terminal station in the case where the relay node that pairs off with said terminal station is not detected.

* * * * *